United States Patent
Ohba

(10) Patent No.: US 6,760,541 B1
(45) Date of Patent: Jul. 6, 2004

(54) INFORMATION PROCESSING DEVICE AND METHOD, DISTRIBUTION MEDIUM, AND RECORDING MEDIUM

(75) Inventor: Akio Ohba, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/315,083

(22) Filed: May 19, 1999

(30) Foreign Application Priority Data

May 20, 1998 (JP) .......................................... P10-138042

(51) Int. Cl.[7] .............................. H04N 5/85; H04N 5/91
(52) U.S. Cl. ........................................ 386/125; 386/46
(58) Field of Search ................................. 386/125, 126, 386/124, 105, 106, 45, 46, 1, 94, 95, 40, 123, 52, 4, 37; 463/1, 9, 31; H04N 5/85, 5/91

(56) References Cited

U.S. PATENT DOCUMENTS 5,048,831 A  *  9/1991  Sides
5,627,655 A  *  5/1997  Okamoto et al.
6,062,978 A  *  5/2000  Martino et al.

FOREIGN PATENT DOCUMENTS

| JP | 55-26791 | 2/1980 |
| JP | 57-204076 | 12/1982 |
| JP | 59-214881 | 12/1984 |
| JP | 1-177491 | 12/1989 |
| JP | 4-235590 | 8/1992 |

\* cited by examiner

Primary Examiner—Robert Chevalier
(74) Attorney, Agent, or Firm—Katten Muchin Zavis Rosenman

(57) ABSTRACT

To distribute data for an information processing device, and if an improper electronic device connection is made, to inform the user of this fact and have him make the correct connection. If a correct connection is made, image part 61 is displayed on a display device, such as a television receiver. When an incorrect electronic device connection is made, data part 62 is displayed on the screen of the image display device together with image part 61. Option data area 62a of data part 62 notifies the user by a caption that an improper connection has been made. Data for the information processing device to perform various processing is recorded in basic data area 62b. Data consisting of image part 61 and data part 62 is thus input to the image processing device, and if correct connections are made, then in accordance with the data of basic data area 62b, the data that is input is processed so that only image part 61 is displayed on the image display device.

11 Claims, 9 Drawing Sheets

INFORMATION PROCESSING DEVICE AND METHOD, DISTRIBUTION MEDIUM, AND RECORDING MEDIUM

FIELD OF THE INVENTION

This invention relates to an information processing device, method, distribution medium, and recording medium. More specifically, the invention relates to an information processing device, method, distribution medium and recording medium in which data for an information processing device to perform prescribed processing on is distributed. The screen display is made to appear different if the connection between devices is correct than when it is not correct. When a connection is not correct, data is also distributed to display a message informing the user of this fact.

BACKGROUND OF THE INVENTION

When faced with the problem of connecting various electronic devices together, users have done so while reading the manuals that come with the devices and describe how to connect them. These manuals are books, and the user generally makes the connections while reading the instructions in the manuals. There are also methods by which the instructions to make the connections is recorded on videotape, and the user learns how to make connections by playing the videotape.

If data is to be exchanged between electronic devices, it has been done using specialized circuits including a local area network (LAN), modem, or infrared date association (IrDA) or other serial or parallel circuits, using a floppy disk or other packages media, or using a specialized protocol.

However, if the user connects the electronic devices after reading the explanations in the manuals, three-dimensional connection relationships may be hard to understand from the two-dimensional diagrams printed in the manuals, and incorrect connections may be made. If a video tape recorder is used to play taped instructions and is in a different room than the device to be connected, the user will be unable to make connections while viewing the displayed screen so the user will have to watch the video tape recorder for a while, learn the connection relationship, and then make the actual device connections. In order to fully understand the connection relationship, the user may have to watch the video tape recorder repeatedly, which is not conducive to real-time performance.

If the electronic device is, for example, a game machine, it is difficult to exchange data with another device, because a different protocol is used for each type of game machine.

SUMMARY OF THE INVENTION

The present invention displays different screens when the connection is correct and when it is incorrect. If the connection is incorrect, a message notifying the user of this fact and the correct way to make the connection is displayed, and because data for a television receiver can be processed, data can be exchanged with a device that handles data for a television receiver.

The information processing device of the present invention has an input means that inputs video data in which first data for the information processing device to perform prescribed processing on and second data for displaying images on an image display device are arranged in effective screen regions; an output means that outputs video data input by said input means for displaying it on said image display device; and a processing means that extracts and processes said first data from the video data input by said input means.

The information processing method of the present invention includes an input step that inputs video data in which first data for the information processing device to perform the prescribed processing on and second data for displaying images on an image display device are arranged in effective screen regions; an output step that outputs video data input in said input step for displaying it on said image display device; and a processing step that extracts and processes said first data from the video data input in said input step.

The distribution medium of the present invention includes an output step that outputs video data in which first data for the information processing device to perform the prescribed processing on and second data for displaying images on an image display device are arranged in effective screen regions; an output step that outputs video data input in said input step for displaying it on said image display device; and a processing step that extracts and processes said first data from the video data input in said input step.

Video data is recorded on the recording medium in which first data that an information processing device processes and second data for said image display device are arranged in effective screen regions.

The information processing device and method, distribution medium, and recording medium of the invention have video data input in which first data for the information processing device to perform the prescribed processing on and second data for displaying images on an image display device are arranged in effective screen regions, the input video data is output for displaying on a video image device, and the first data is extracted and processed from the input video data.

In the recording medium video data is recorded in which first data that an information processing device processes and second data for said image display device are arranged in effective screen regions.

DETAILED DESCRIPTION OF THE PREFERRED EMBODIMENT

The information processing device has an input means (for example, PCRPC 44 in FIG. 2) that inputs video data in which first data (for example, basic data area 62b in FIG. 3) for the information processing device to perform the prescribed processing on and second data (for example, image unit 61 in FIG. 3) for displaying images on an image display device are arranged in effective screen regions; an output means (for example, step S13 in FIG. 5) that outputs video data input by the input means for displaying it on the image display device; and a processing means (for example, step S13 in FIG. 5) that extracts and processes the first data from the video data input by the input means.

The information processing device generates second data which includes third data (for example, option data area 62a in FIG. 3) for prescribed warnings, and the processing means controls the display of the third data on the image display device in accordance with the results of the processing of the first data.

The information processing device generates video data which includes fourth data (for example, standard data area 62c in FIG. 3) that serves as a standard for extracting the first data, and the processing means extracts the first data by taking the fourth data as a standard.

Figure 1:
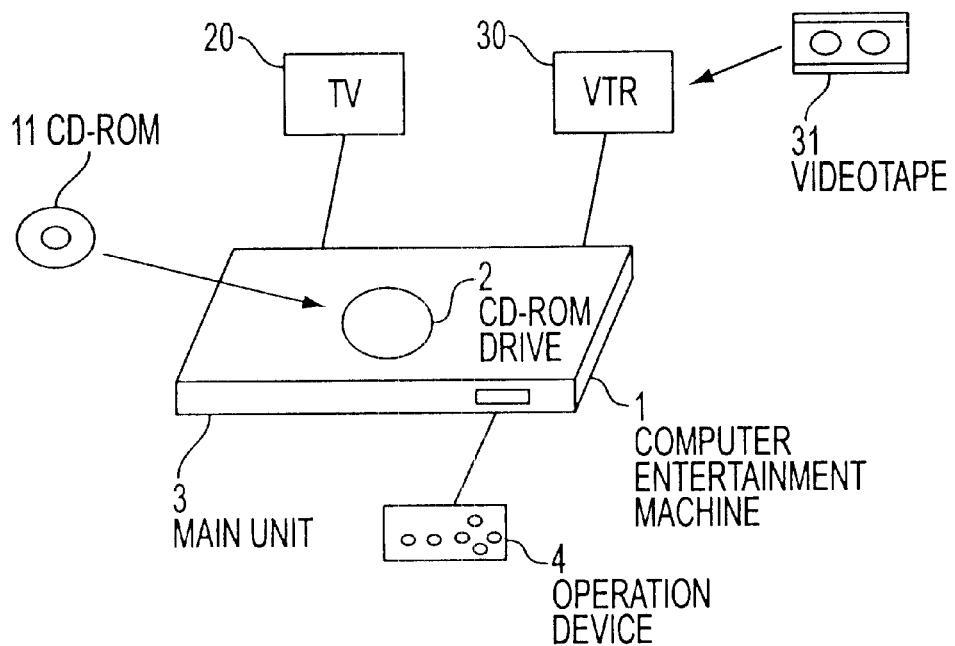
FIG. 1 shows an example of the configuration in a case where the information processing device of the invention is applied to a computer entertainment device.

FIG. 1 shows the various components of the information processing device utilizing a computer entertainment machine and its connection relationship with other electronic devices. Connected to main unit 3 of computer entertainment machine 1 are CD-ROM drive 2, which plays CD-ROM 11 on which data is recorded, and operation device 4, which consists of multiple buttons or joysticks, etc. Also connected to main unit 3 are television receiver (TV) 20 and other electronic devices, as well as VTR (video tape recorder) 30, which plays videotape 31. VTR 30 may be a game machine or a TV tuner (STB). Also, any other optical disk and disk drive such as DVD-ROM and DVD-ROM drive may be used instead of CD-ROM 11 and CD-ROM drive 2.

Figure 2:
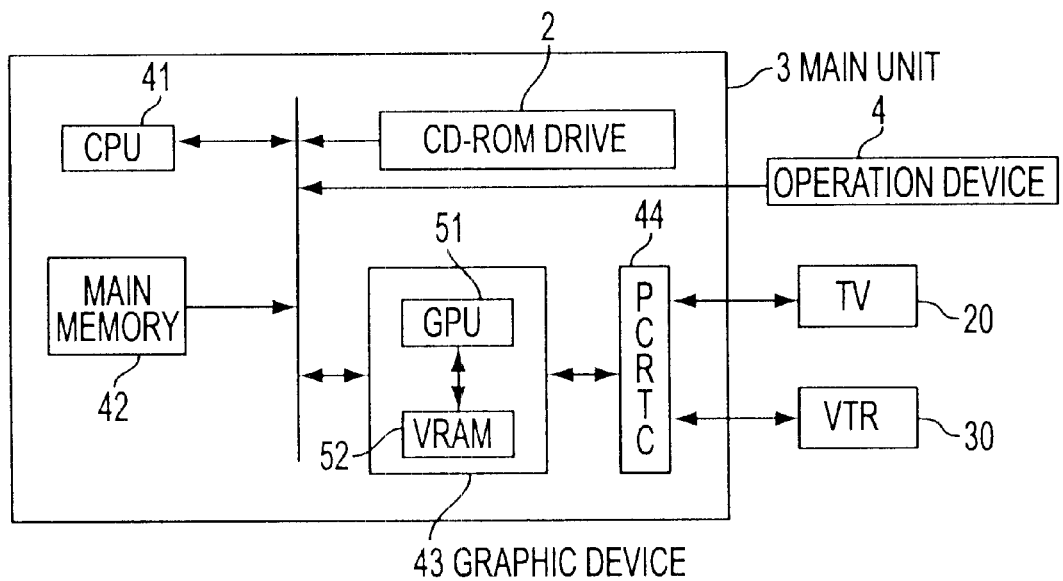
FIG. 2 shows the internal configuration of a computer entertainment device.

FIG. 2 shows an example of the internal structure of computer entertainment machine 1. CPU (central processing unit) 41 performs various operations in accordance with various programs recorded in main memory 42. For example, in response to instructions output from operation device 4, CPU 41 reads data from CD-ROM 11, which is put into CD-ROM drive 2, stores this data in main memory 42, and transfers data stored in main memory 42 to graphic device 43 and draws it.

Graphic device 43 consists internally of GPU (graphic processing unit) 51 and VRAM (video RAM) 52, and TV 20 and VTR 30 are connected to it via PCRTC (programmable cathode ray tube controller) 44. The data of videotape 31 played on VTR 30 is input to PCRTC 44, it is converted to data that can be processed by computer entertainment machine 1, then it is input to graphic device 43. The input data is stored in VRAM 52. The data stored in VRAM 52 undergoes drawing processing by GPU 51 as necessary and is output to TV 20 via PCRTC 44. Graphic device 43 processes the data stored in main memory 42 according to the instructions of CPU 41, and the processed data is output to TV 20 via PCRTC 44.

Figure 3A:
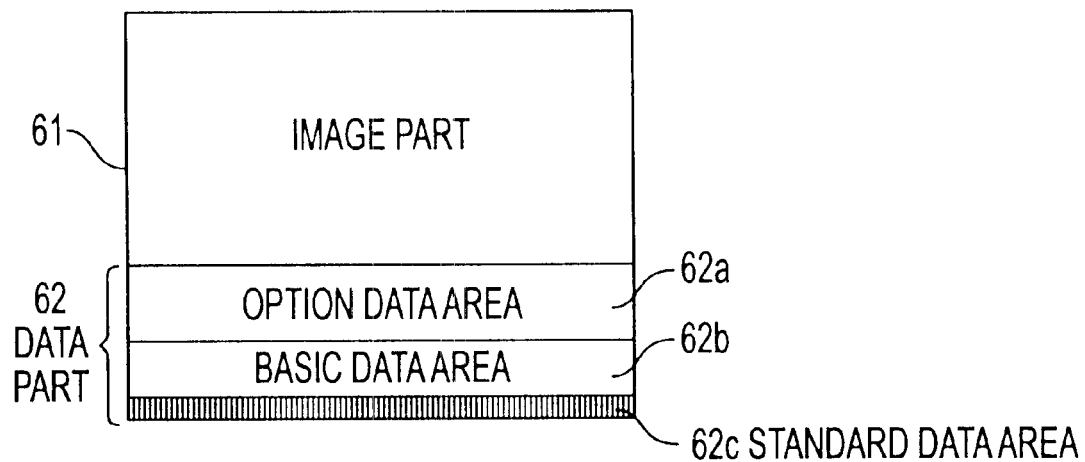
FIG. 3A and FIG. 3B show the structure of data supplied to a computer entertainment device.
Figure 3B:
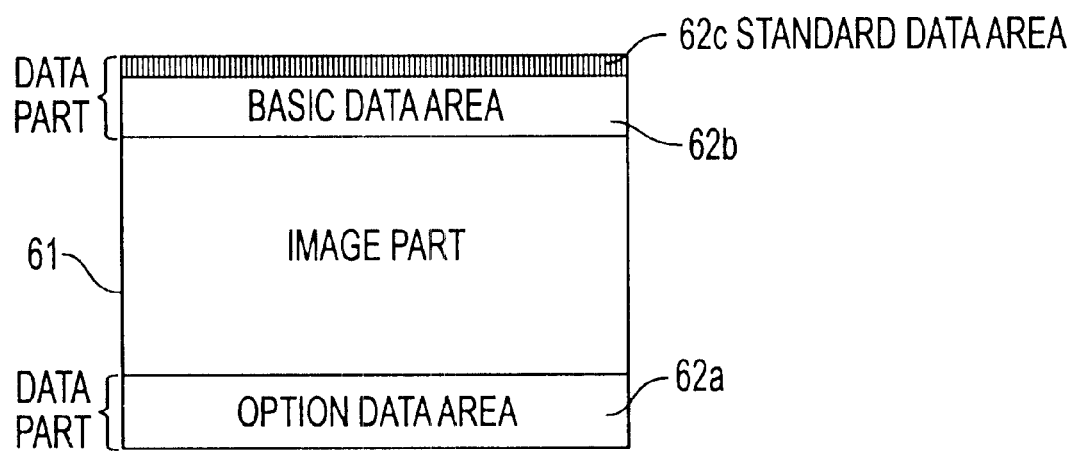

The data structure of the data read from videotape 31 is described using FIG. 3. This data structure consists of image part 61 and data part 62, and data part 62 consists of option data area 62a, basic data area 62b, and standard data area 62c. In FIG. 3(A), basic data area 62b and standard data area 62c appear at the bottom, and in FIG. 3(B) they appear at the top. In this way, basic data area 62b and standard data area 62c may be provided either at the top or at the bottom.

Data of the display screen to be displayed on TV 20 is stored in image part 61. Stored in option data area 62a of data part 62 are, for example, captions (telops) to be displayed on TV 20 if computer entertainment machine 1 is not correctly connected to TV 20 or VTR 30. Stored in basic data area 62b of data part 62 are the size of the image when data stored in image part 61 and the optional area is to be displayed on the screen of TV 20, the data type, the page number, the final page number, and the game data of computer entertainment machine 1.

Standard data area 62c, which is allocated at either the bottom (FIG. 3(A)) or the top (FIG. 3(B)) of basic data area 62b, is stripe image data for image data reference (for distortion correction); based on this standard data area 62c, the data stored in basic data area 62b is binary-coded and is converted to data that can be processed by CPU 41 of computer entertainment machine 1.

Figure 4:
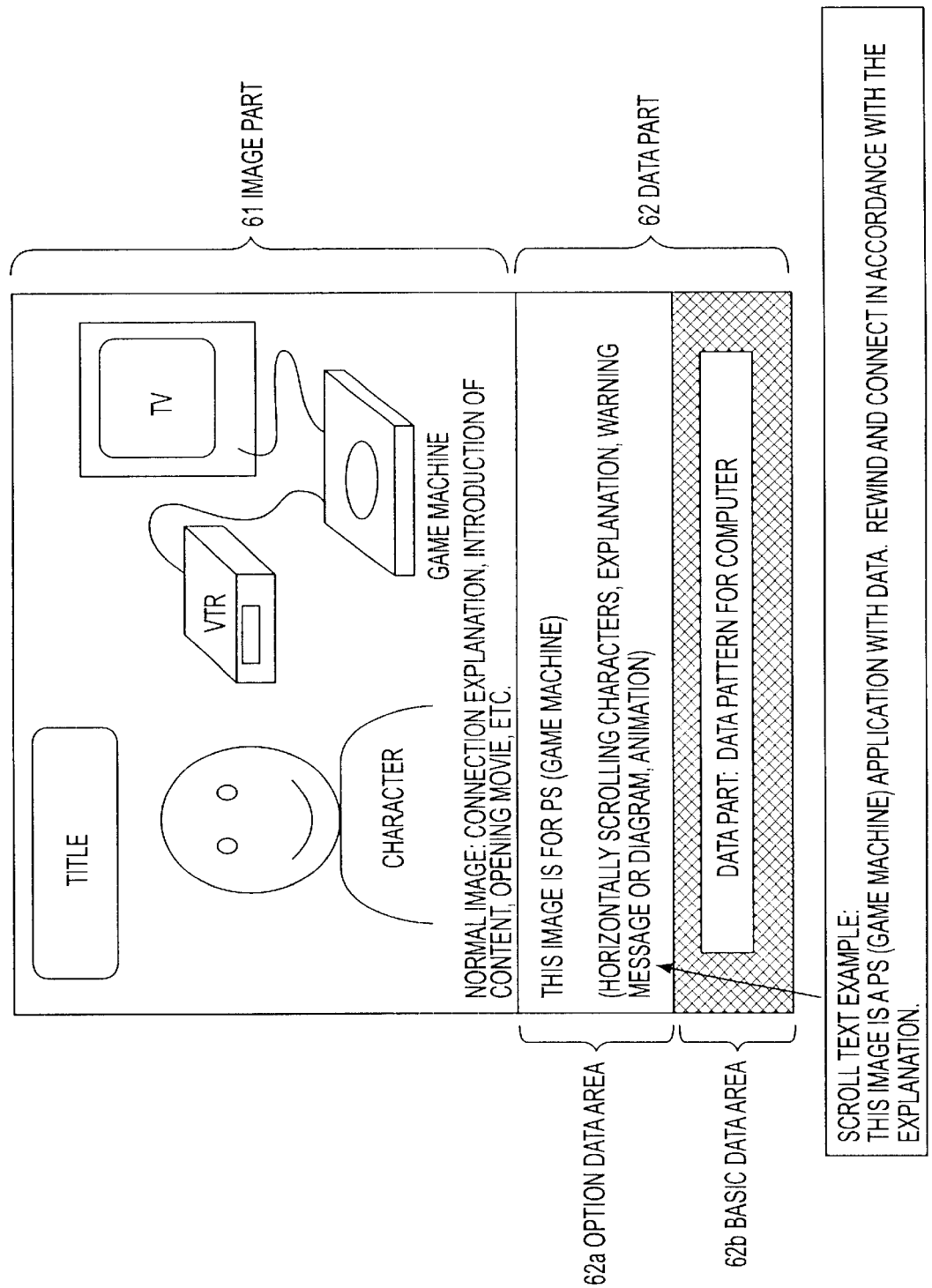
FIG. 4 shows a display example where data of the data structure shown in FIG. 3 is played.

FIG. 4 shows a display example in which the data structure shown in FIG. 3(A) is actually displayed together. Displayed in image part 61 are the title and character, as well as a picture of the game machine, TV, and VTR correctly connected. In addition, an introduction to the content of the game or an opening movie is displayed.

When data having this data structure is input to TV 20 without going through computer entertainment machine 1, a caption informing the user of this fact is displayed in option data area 62a. An example of such a caption is shown in FIG. 4: "This image is a PS (game machine) application with data. Rewind and connect as explained." Of course, other captions, pictures, or animations may also be displayed.

Basic data area 62b is data for processing by computer entertainment machine 1, so it is an image that the user will not understand if it is displayed on TV 20.

Figure 5:
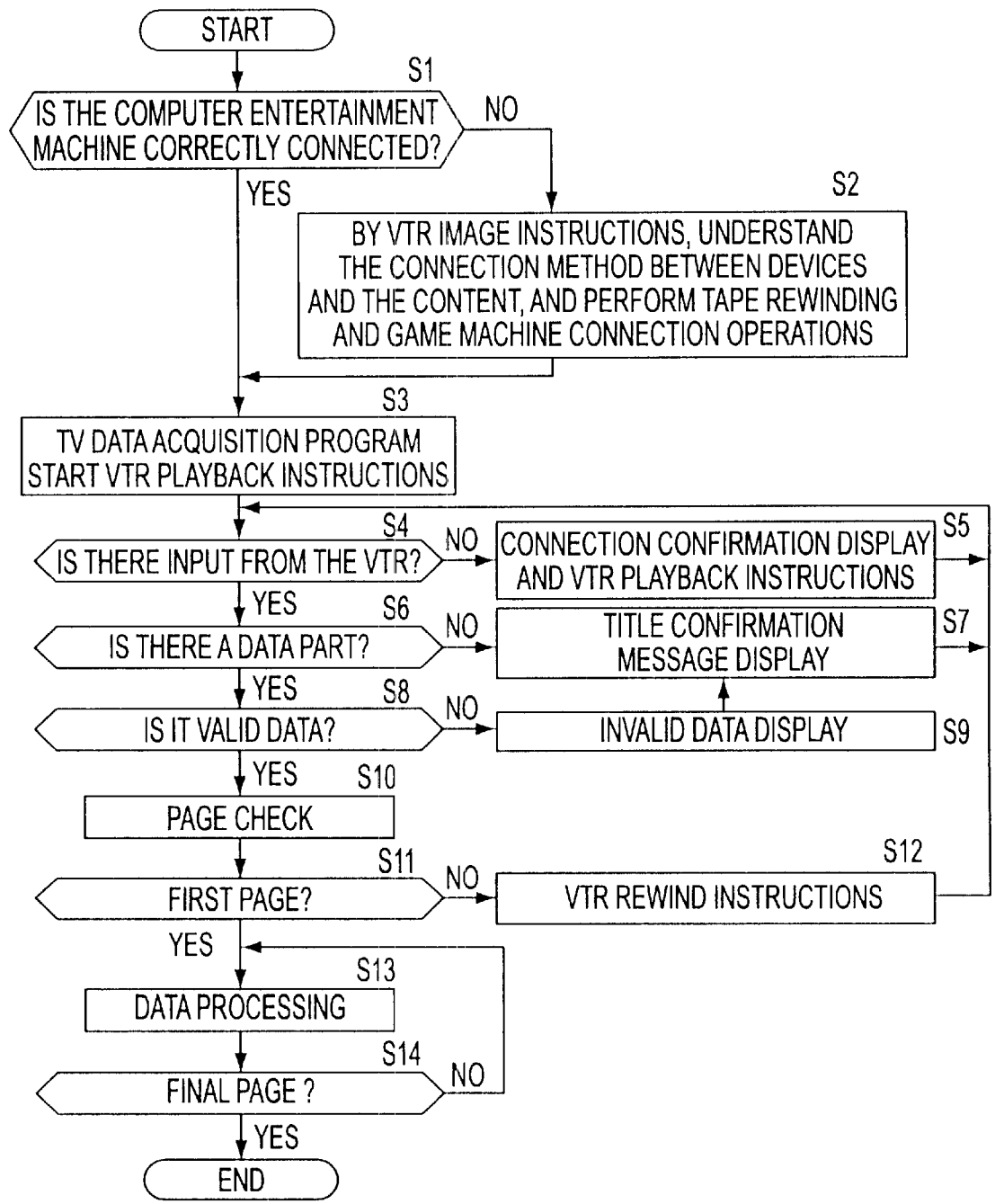
FIG. 5 is a flowchart describing the operation of a computer entertainment device.

The flowchart in FIG. 5 shows the case in which computer entertainment machine 1 acquires data from VTR 30. First, in step S1, it is decided whether computer entertainment machine 1 is correctly connected. The user may of course make this decision visually, but the decision may also be made as shown in the following.

Figure 6A:
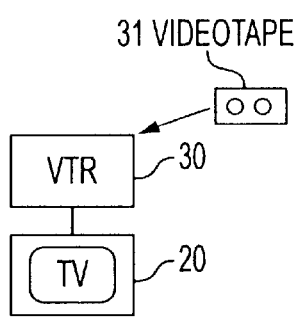
FIG. 6A and FIG. 6B are diagrams describing the connection of the devices.

If only TV 20 and VTR 30 are connected as in FIG. 6(A), that is, if computer entertainment machine 1 is not connected, then data having the data structure shown in FIG. 3 is played from videotape 31 by VTR 30 and is output to TV 20. Since TV 20 cannot process the data of basic data area 62b, the input data is not processed, that is, a screen as shown in FIG. 4 is displayed. Therefore the user, by looking at the screen displayed on TV 20, can judge whether computer entertainment machine 1 is correctly connected.

Figure 6B:
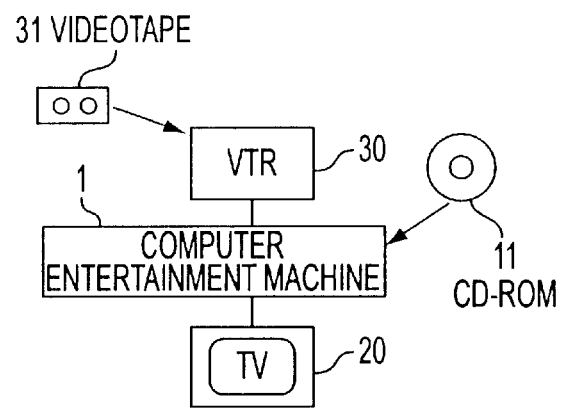

In step S2, the user sees the caption displayed in option data area 62a on the screen displayed on TV 20 such as shown in FIG. 4 and learns that videotape 31 now being played on VTR 30 is videotape 31 for computer entertainment machine 1, and seeing the correct connection displayed in image part 61, he makes the connections as shown in FIG. 6(B). That is, after the data output from VTR 30 is input to computer entertainment machine 1, where the prescribed processing is done, it is output to TV 20, and the user connects computer entertainment machine 1, TV 20, and VTR 30 so that it is played back. The user also rewinds videotape 31.

If in step S2 computer entertainment machine 1 is connected or if in step S1 it is decided that computer entertainment machine 1 is correctly connected, it proceeds to step S3, and acquisition of TV data by computer entertainment machine 1 is begun. First, in step S3, CPU 41 of computer entertainment machine 1 reads data stored in main memory 42 concerning a message that gives instructions to play videotape 31, causes this data to be transferred to graphic device 43, and causes it to be drawn on graphic device 43. As a result, a message such as "Play the videotape" is output to TV 20 via PCRTC 44 and is displayed.

After the message is displayed on TV 20, the processing beginning with step S4 begins. First, in step S4, CPU 41 of computer entertainment machine 1 decides whether the data being played on VTR 30 is being input to graphic device 43. If it is decided that data from VTR 30 is not being input, it proceeds to step S5.

If data from VTR 30 is not being input to computer entertainment machine 1, there could be two causes: either data is not being input because computer entertainment machine 1 and VTR 30 are not correctly connected, or data is not being input because videotape 31 is not being played. Therefore, in step S5, CPU 41 of computer entertainment machine 1 reads a message to inform the user of this fact from main memory 42, transfers it to graphic device 43, causes drawing processing to be done, outputs it to TV 20 via PCRTC 44, and causes it to be displayed. An example of such a message to be displayed is "Data is not being input. Check the connections, and play the videotape from the beginning." When display of the message comes to an end, it returns to step S4 and repeats the processing that begins there.

If in step S4 CPU 41 of computer entertainment machine 1 decides that the data from VTR 30 is not being input to graphic device 43, it proceeds to step S6. In step S6, CPU 41 decides whether basic data area 62b (FIG. 4) exists in the data that has been input in graphic device 43. If it decides that basic data area 62b does not exist, it proceeds to step S7.

The nonexistence of basic data area 62b in the data input in graphic device 43 of computer entertainment machine 1 means that it is a videotape on which general images such as movies are recorded and that it is not videotape 28 for computer entertainment machine 1. Therefore in step S7, CPU 41 displays on TV 20 a message announcing that the title of videotape 31 is different. A typical such message is "Check the title." When display of this message comes to an end, it returns to step S4, and the processing that begins there is repeated.

If in step S6 it is decided that basic data area 62b does not exist in the data that has been input, CPU 41 reads only basic data area 62b of the data from graphic device 43, analyzes this data, and decides whether it is valid data. If it decides that it is not valid data, it proceeds to step S9. Deciding that it is not valid data could mean that it is data of an old version that cannot be used with the computer entertainment machine 1 presently in use, or that it is data of a different game machine.

Therefore, computer entertainment machine 1 displays on TV 20 a message informing the user that it is invalid data. A typical message would be "The version is different." After this is displayed, it proceeds to step S7, and a title confirmation message as described above is displayed on TV 20. Then it returns to step S4 and repeats the processing that begins there.

If in step S8 it is decided that the data that has been input is valid data, it proceeds to step S10. In step S10, the page number is read from the data of basic data area 62b. This page number is a number assigned in sequence to the different screens displayed on TV 20 in accordance with the data of image part 61.

In step S11, it is decided whether the page number read in step 10 is the first page. If it is decided that it is not the first page, it proceeds to step S12. Deciding that it is not the first page indicates that videotape 28 being played is being played from midway, so in step S12 a message informing the user of this fact is displayed on TV 20. A typical message to display is "Rewind the videotape and play from the beginning." When this display ends, it returns to step S4 and repeats the processing that begins there.

If in step S11 it is decided that the page number read from basic data area 62b indicates the first page, it proceeds to step S13. In step S13, CPU 41 of computer entertainment machine 1 processes the data played on VTR 30 that has been input. From the data input to graphic device 43, CPU 41 first reads the data of basic data area 62b, and carries out processing based on this read data. For example, among the data that has been input to graphic device 43, it causes only the data of image part 61 to be stored in VRAM 52, and as necessary it reads and transfers to TV 20 the data that has been stored or, without storing it in VRAM 52, it transfers to TV 20 only the data of image part 61 among the data that has been input.

Thus, if the connections between devices and the videotape 28 to be played are correct, the content of the game or the opening movie (only the data of image part 61) is displayed on TV 20. Conversely, if a connection between devices or the videotape 31 to be played is incorrect, a caption announcing this fact (for example, the data of option data area 62a) is displayed on TV 20 together with the aforesaid opening movie; in this way, when the user makes a mistaken connection or operation, he can recognize this fact and learn the correct connection or operation.

In step S14, CPU 41 decides whether the page number of the data of basic data area 62b that has been read is the final page number. If it is decided that it is not the final page number, it returns to step S13 and repeats the processing that begins there. On the other hand, if it is decided that it is the final page number, the processing of this flowchart is terminated.

By the processing of step S13 and step S14, while the data being played on VTR 30 is being displayed on TV 20, it suffices to read data from CD-ROM 11 in CD-ROM drive 2 and cause it to be stored in main memory 42. By doing this, when playback of the data by VTR 30 ends, the user can begin the game without any waiting time. Also, in addition to the aforesaid page number and version information, data about the game itself to be used after the playing of videotape 28 ends may be included in the data of basic data area 62b.

Figure 7:
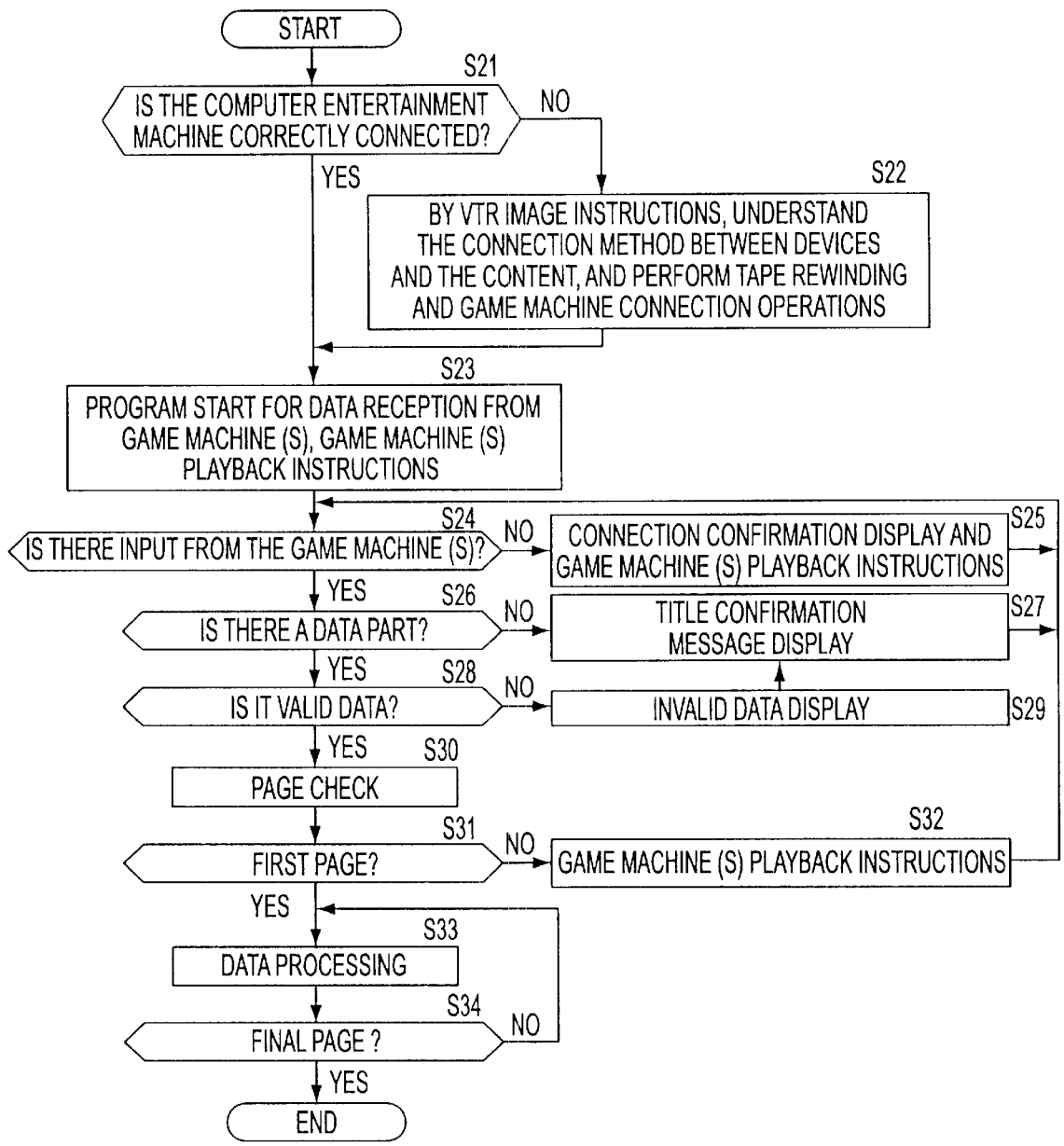
FIG. 7 is a flowchart for describing other operations of a computer entertainment device.

The flowchart in FIG. 7 shows the data acquisition operation of computer entertainment machine 1 when game machine 70 is used instead of VTR 30. This game machine 70 is a device that can perform its functions (allowing the user to play the game) independently without being connected to computer entertainment machine 1, by connecting it to TV 20, and it is a device that uses a second CD-ROM as the recording medium on which game data is recorded.

Figure 8A:
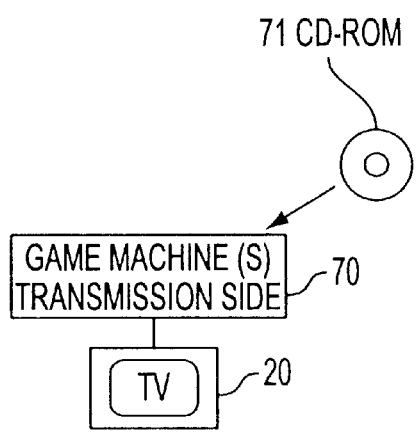
FIG. 8A and FIG. 8B are diagrams explaining the connections of other devices.

First, in step S21, it is decided whether computer entertainment machine 1 is correctly connected. This decision is made as explained for step S1 in FIG. 5. Therefore if, as in FIG. 8(A), only TV 20 and game machine 70 are connected, in other words, if computer entertainment machine 1 is not connected, then data having the data structure shown in FIG. 3 is read by game machine 70 and is output to TV 20, so a screen such as is shown in FIG. 4 is displayed on TV 20, and therefore the user, by looking at the display screen, can recognize that the connection of computer entertainment machine 1 is not correct or that computer entertainment machine 1 is not connected.

Figure 8B:
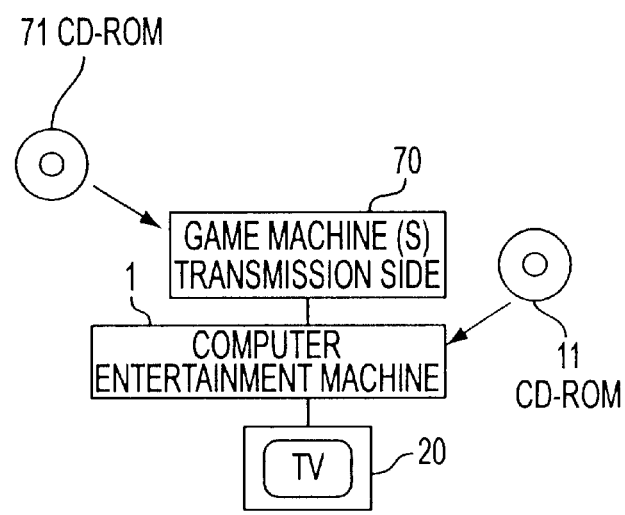

In step S22, in the screen displayed on TV 20, first the user sees the caption displayed in option data area 62a and learns that second CD-ROM 71 now being played on game machine 70 is a recording medium for supplying data to computer entertainment machine 1, and seeing the correct connection displayed in image part 61, the user makes the connections as shown in FIG. 8(B). That is, after the data output from game machine 70 is input to computer entertainment machine 1, where the prescribed processing is done, it is output to TV 20, and the user connects computer game machine 70, entertainment machine 1, and TV 20 so that it is played back.

If in step S22 computer entertainment machine 1 is connected or if in step S21 it is decided that computer entertainment machine 1 is correctly connected, it proceeds to step S23, and acquisition of data by computer entertainment machine 1 is begun. First, in step S23, computer entertainment machine 1 displays on TV 20 a message giving instructions to play second CD-ROM 71 on game machine 70. The data of this message is stored in main memory 42 (FIG. 2) and is, for example, "Play the CD-ROM."

After the message is displayed, the processing beginning with step S24 begins. This processing which begins with step S24 is the same as the processing beginning with step S4 in FIG. 5, so an explanation of it is omitted. But in step S25 a message is displayed to inform the user to play CD-ROM 71 on game machine 70, and in step 32 a message is displayed to inform the user to again play second CD-ROM 71 on game machine 70 from the beginning.

Thus, by connecting a different game machine, while data of second CD-ROM 71 played on game machine 70 is being displayed on TV 20, in computer entertainment machine 1, data from first CD-ROM 11 is played and is stored in main memory 42. And while data stored in main memory 42 is being displayed on TV 20, data of second CD-ROM 71 played on game machine 70 is stored in VRAM 52 or main memory 42 of computer entertainment machine 1. This makes smooth data processing possible by alternately using data played on computer entertainment machine 1 and game machine 70.

Figure 9:
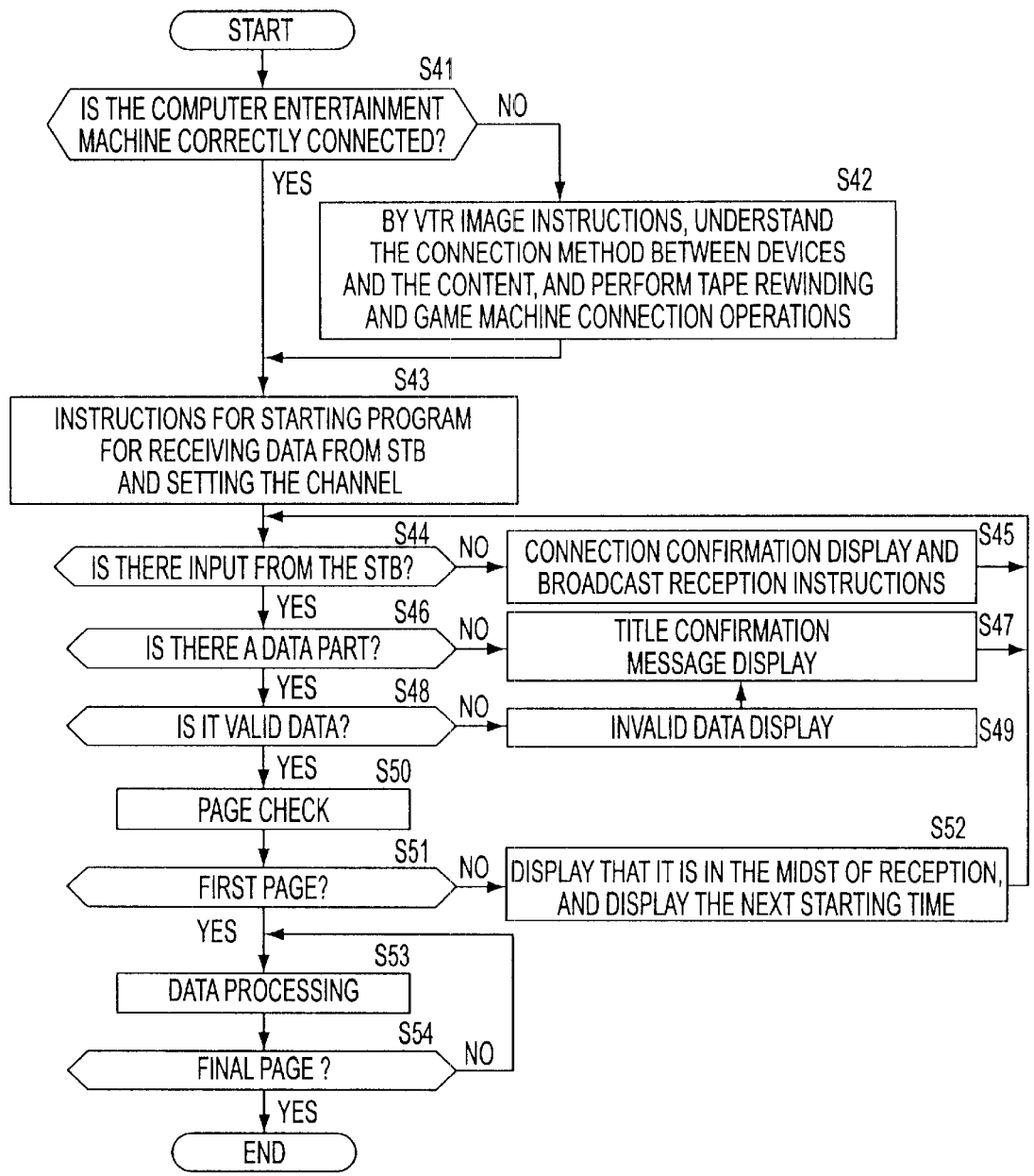
FIG. 9 is a flowchart describing other operations of a computer entertainment device.

Next we describe, with reference to the flowchart in FIG. 9, the case in which a tuner for TV 20, for example, STB (set top box) 80, is used instead of VTR 30. The program data supplied to this STB 80 is data having the data structure shown in FIG. 3. First, in step S41, it is decided whether computer entertainment machine 1 is correctly connected. This decision is made as explained in step S1 in FIG. 5.

Figure 10A:
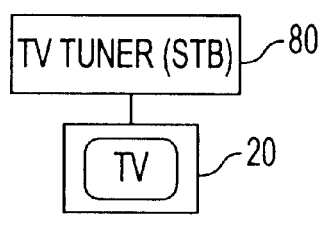
FIG. 10A and FIG. 10B are diagrams explaining connections of still other devices.

Therefore if, as in FIG. 10(A), only TV 20 and STB 80 are connected, in other words, if computer entertainment machine 1 is not connected, then data having the data structure shown in FIG. 3 is received by STB 80 and is input to TV 20, so a screen such as shown in FIG. 4 is displayed on TV 20.

Figure 10B:
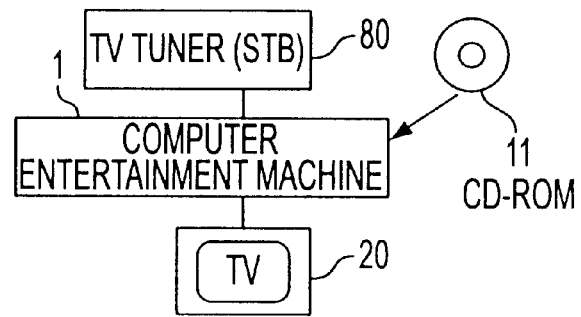

In step S42, in the screen displayed on TV 20, first the user sees the caption displayed in option data area 62a and learns that the program now being received on STB 80 (the program being displayed on TV 20) is a program for entertainment machine 1, and seeing the correct connection displayed in image part 61, he makes the connections as shown in FIG. 10(B). That is, after the data received by STB 80 is input to computer entertainment machine 1, where the prescribed processing is done, it is output to TV 20, and STB 80, computer entertainment machine 1, and TV 20 are connected so that it is played back.

Here the caption of option data area 62a to be displayed on TV 20 is, for example, "This program is a program that distributes data for a game machine. Referring to the above connection method, connect the game machine and enjoy." The user is made to recognize that it is a program for computer entertainment machine 1, and it is a message prompting him to connect computer entertainment machine 1.

In step S42, if computer entertainment machine 1 is connected, it proceeds to step S43, and data acquisition by computer entertainment machine 1 is begun. First, in step S43, CPU 41 displays on TV 20 a message giving instructions to set it to the channel on which data for the game is being transmitted. This message data, which is stored in main memory 42 (FIG. 2), is, for example, "Set the channel to a game program."

After the message is displayed and the prescribed time has elapsed, the processing that begins with step S44 is begun. This processing that begins with step S44 is the same as the processing that begins with step S4 in FIG. 5, so an explanation of it is omitted. But in step S45 a message is displayed to encourage the user to receive the program for the game, and in step S52 it is displayed that the program now being received is in its midst, and the starting time for when the same program will next be broadcast is displayed as well.

For example, if computer entertainment machine 1 is used as a playback machine for learning software that requires periodic updating, the learning software is received by STB 80 and is stored in main memory 42 or another recording medium. Done this way, there is no longer any need to send a package such as a floppy disk to the user's house, and it can be simultaneously distributed to many users.

In this specification, the distribution medium on which a computer program that executes the aforesaid processing is provided to users includes, besides magnetic disk, CD-ROM, and other information recording media, transmission media by network, such as Internet and digital satellite.

As is clear from the above-described embodiment, this invention, understood from other aspects, is able to realize the following.

(1) A computer entertainment system 1 that has at least
a main unit 3 on which can be mounted an optical disk or other recording medium 11 on which game data is recorded, and that has at least a main memory 42 into which the game data of the recording medium is read and recorded, a CPU 41 that processes said game data, and a graphic device 43 that generates image data,
an operation device 4 that is connected to the main unit and controls the progress of the game according to the operation of the game players, and
a display means that is connected to the main unit and mainly displays game images, and
an electronic device that is connected to the main unit and provides connection information between the devices that comprise the computer entertainment system.

(2) A computer entertainment system as described in aforesaid (1), in which the electronic device is a video tape recorder that holds a videotape.

(3) A computer entertainment system as described in aforesaid (1), in which the electronic device is a game machine that holds an optical disk.

(4) A computer entertainment system as described in aforesaid (1), in which the electronic device is a television tuner.

(5) A computer entertainment system as described in aforesaid (1), in which the electronic device is an electronic device that can provide an Internet means. (6) A computer entertainment system as described in aforesaid (1), in which the connection information between the devices includes at least image data on display images to be displayed on said display means, option data that through said display images informs the game players when the connection between devices is not normal, and basic data that has control information for displaying said connection information on said display means.

(7) A computer entertainment system as described in aforesaid (6), in which said electronic device has, in addition to connection information between devices, game data.

As described above, with the information processing device, information processing method, and distribution medium of this invention, video data is input in which first data for the information processing device to perform the prescribed processing on and second data for displaying images on an image display device are arranged in effective screen regions; the video data that is input is output for displaying it on the image display device; and the first data is extracted and processed from the video data that is input, and thus data necessary for the information processing device to perform various processing on is distributed, and if the information processing device and the image display device are not correctly connected, a caption to inform the user of this fact can be displayed.

With the distribution medium of this invention, video data is recorded in which first data to be processed by an information processing device and second data for an image display device are arranged in effective screen regions, and thus data necessary for the information processing device to perform various processing on is distributed, and if the information processing device and the image display device are not correctly connected, a caption to inform the user of this fact can be displayed.

What is claimed is:

1. An information processing device comprising:

an input means that inputs video data in which first data for the information processing device to perform the prescribed processing on and second data for displaying images on an image display device are arranged in effective screen regions, an output means that outputs video date input by said input means for displaying it on said image display device, and a processing means that extracts and processes said first data from the video data input by said input means, wherein said second data includes third data for prescribed warnings, and said processing means controls the display of said third data on said image display device in accordance with the results of the processing of said first data.

2. An information processing device comprising;

an input means that inputs video data in which first data for the information processing device to perform the prescribed processing on and second data for displaying images on an image display device are arranged in effective screen regions, an output means that outputs video data input by said input means for displaying it on said image display device, and a processing means that extracts and processes said first data from the video data input by said input means, wherein said video data includes third data that serves as a standard for extracting said first data, and said processing means extracts said first data by taking said third data as a standard.

3. An information processing method comprising:

an input step that inputs video data in which first data for the information processing device to perform the prescribed processing on and second data for displaying images on an image display device are arranged in effective screen regions, an output step that outputs video data input in said input step for displaying it on said image display device, and a processing step that extracts and processes said first data from the video data input in said input step, wherein said second data includes third data for prescribed warnings, and said processing step controls the display of said third data on said image display device in accordance with the results of the processing of said first data.

4. A recording medium on which is recorded video data to be displayed on an image display device comprising:

a recording medium including video data is recorded in which first data that an information processing device processes and second data for said image display device are arranged in effective screen regions, wherein said second data includes third data whose display is controlled in accordance with the results of the processing of said first data by said information processing device.

5. A recording medium on which is recorded video data to be displayed on an image display device comprising:

a recording medium including video data is recorded in which first data that an information processing device processes and second data for said image display device are arranged in effective screen regions, said video data further includes third data that serves as a standard by which said information processing device extracts said first data.

6. A computer entertainment system that has at least a main unit on which can be mounted an optical disk or other recording medium on which game data is recorded, and that has at least a main memory into which the game data of said recording medium is read and recorded, a CPU that processes said game data, and a graphic device that generates image data comprising:

an operation device that is connected to said main unit and controls the progress of the game according to the operation of the game players, a display means that is connected to said main unit and mainly displays game images, and an electronic device connected to said main unit providing connection information between the devices that comprise said computer entertainment system, wherein said electronic device is a video tape recorder.

7. A computer entertainment system that has at least a main unit on which can be mounted an optical disk or other recording medium on which game data is recorded, and that has at least a main memory into which the game data of said recording medium is read and recorded, a CPU that processes said game data, and a graphic device that generates image data comprising:

an operation device that is connected to said main unit and controls the progress of the game according to the operation of the game players, a display means that is connected to said main unit and mainly displays game images, and an electronic device connected to said main unit providing connection information between the devices that comprise said computer entertainment system, wherein said electronic device is a game machine capable of using an optical disk.

8. A computer entertainment system that has at least a main unit on which can be mounted an optical disk or other recording medium on which game data is recorded, and that has at least a main memory into which the game data of said recording medium is read and recorded, a CPU that processes said game data, and a graphic device that generates image data comprising:

an operation device that is connected to said main unit and controls the progress of the game according to the operation of the game players, a display means that is connected to said main unit and mainly displays game images, and an electronic device connected to said main unit providing connection information between the devices that comprise said computer entertainment system, wherein said electronic device is a television tuner.

9. A computer entertainment system that has at least a main unit on which can be mounted an optical disk or other recording medium on which game data is recorded, and that has at least a main memory into which the game data of said recording medium is read and recorded, a CPU that processes said game data, and a graphic device that generates image data comprising:

an operation device that is connected to said main unit and controls the progress of the same according to the operation of the game players, a display means that is connected to said main unit and mainly displays game images, and an electronic device connected to said main unit providing connection information between the devices that comprise said computer entertainment system, wherein the connection information between the devices includes at least image data on display images to be displayed on said display means, option data that through said display images informs the game players when the connection between devices is not normal, and basic data that has control information for displaying said connection information on said display means.

10. A computer entertainment system according to claim 9 wherein the electronic device has game data, in addition to connection between devices.

11. An information processing method comprising:

input step that inputs video data in which first data for the information processing device to perform the prescribed processing on and second data for displaying images on an image display device are arranged in effective screen regions, an output step that outputs video data input in said input step for displaying it on said image display device, and a processing step that extracts and processes said first data from the video data input in said input step, wherein said video data includes third data that serves as a standard for extracting said first data, and said processing step extracts said first data by taking said third data as a standard.

* * * * *